(12) United States Patent
Seamans

(10) Patent No.: US 7,146,751 B2
(45) Date of Patent: Dec. 12, 2006

(54) FOOTWEAR PIECES

(75) Inventor: Scott Seamans, Boulder, CO (US)

(73) Assignee: Crocs, Inc., Niwot, CO (US)

( * ) Notice: Subject to any disclaimer, the term of this patent is extended or adjusted under 35 U.S.C. 154(b) by 0 days.

(21) Appl. No.: 10/803,569

(22) Filed: Mar. 17, 2004

(65) Prior Publication Data

US 2004/0231191 A1    Nov. 25, 2004

Related U.S. Application Data

(63) Continuation-in-part of application No. 10/603,126, filed on Jun. 23, 2003, now Pat. No. 6,993,858, and a continuation-in-part of application No. 10/602,416, filed on Jun. 23, 2003.

(60) Provisional application No. 60/473,360, filed on May 23, 2003, provisional application No. 60/473,371, filed on May 23, 2003.

(51) Int. Cl.
*A43C 11/00* (2006.01)
*A43B 7/06* (2006.01)

(52) U.S. Cl. .............................. 36/50.1; 36/11.5; 2/946

(58) Field of Classification Search ................. 36/50.1, 36/11.5, 101, 50.5, 45; D2/946, 916–918
See application file for complete search history.

(56) References Cited

U.S. PATENT DOCUMENTS

| | | |
|---|---|---|
| 1,392,350 A | 10/1921 | O'Brien |
| D66,083 S | 11/1924 | Johnson |
| 2,180,924 A | 11/1939 | Dunbar |
| 2,470,089 A | 5/1949 | Booth |
| D155,956 S | 11/1949 | Wood |
| 3,698,107 A | 10/1972 | Fukuoka |
| 4,032,611 A | 6/1977 | Fukuoka |
| D247,136 S | 2/1978 | Mizoguchi |
| 4,100,685 A | 7/1978 | Dassler |
| D251,158 S | 2/1979 | Edmonds |
| 4,408,401 A | 10/1983 | Seidel et al. |
| 4,476,600 A | 10/1984 | Seidel et al. |
| 4,888,887 A | 12/1989 | Solow |
| 4,967,750 A | 11/1990 | Cherniak |
| 5,369,895 A | 12/1994 | Hammerschmidt |
| D355,526 S | 2/1995 | Duclos |
| 5,438,767 A * | 8/1995 | Stein ............................ 36/11.5 |
| D368,797 S | 4/1996 | Brooks et al. |
| 5,528,841 A | 6/1996 | Pozzobon |
| 5,561,919 A * | 10/1996 | Gill ............................ 36/11.5 |
| D381,794 S | 8/1997 | Gelli |
| 5,736,167 A | 4/1998 | Chang |
| 5,814,254 A | 9/1998 | Bisconti |
| D416,667 S | 11/1999 | Lamstein |

(Continued)

FOREIGN PATENT DOCUMENTS

CA    2375957    9/2002

(Continued)

OTHER PUBLICATIONS

Rhoda Miel, Snowshoe walks away with best design, *Plastics News*, Apr. 22, 2002, v14, n8, p. 4 (2 pages).

(Continued)

*Primary Examiner*—Jila M. Mohandesi
(74) *Attorney, Agent, or Firm*—Townsend and Townsend and Crew LLP

(57) ABSTRACT

The present invention provides footwear pieces having a sole and an upperportion extending from the sole. The upper portion is adapted to cover the top of the user's foot and includes a rear opening of receiving the user's foot. An adjustable strap is provided across the rear opening to engage the back of the user's foot.

5 Claims, 17 Drawing Sheets

U.S. PATENT DOCUMENTS

| | | | |
|---|---|---|---|
| 6,052,920 | A | 4/2000 | Bathum |
| D428,239 | S | 7/2000 | Plamondon |
| D431,346 | S | 10/2000 | Birkenstock |
| 6,237,249 | B1 | 5/2001 | Aguerre |
| 6,237,250 | B1 * | 5/2001 | Aguerre ............... 36/11.5 |
| 6,256,906 | B1 | 7/2001 | Matis et al. |
| 6,416,610 | B1 | 7/2002 | Matis et al. |
| 6,439,536 | B1 | 8/2002 | Piccolo |
| D467,065 | S | 12/2002 | Chen |
| D476,797 | S * | 7/2003 | Schenone ............... D2/946 |
| D479,034 | S | 9/2003 | Tzenos |
| 6,640,464 | B1 * | 11/2003 | Hsin et al. ............... 36/11.5 |
| D492,095 | S | 6/2004 | Sanchez et al. |
| D492,096 | S | 6/2004 | Sanchez et al. |
| D492,841 | S | 7/2004 | Magro |
| D493,611 | S | 8/2004 | Chen |
| D494,345 | S | 8/2004 | Werman |
| 6,860,035 | B1 * | 3/2005 | Girard ............... 36/50.1 |
| 2001/0001350 | A1 | 5/2001 | Aguerre |
| 2002/0124434 | A1 | 9/2002 | Hsin et al. |
| 2003/0074806 | A1 | 4/2003 | Urie et al. |

FOREIGN PATENT DOCUMENTS

| | | |
|---|---|---|
| DE | 1057913 B | 5/1959 |
| EP | 0802039 A2 | 10/1997 |
| EP | 0802040 A2 | 10/1997 |
| EP | 0802041 A2 | 10/1997 |
| EP | 0884005 A1 | 12/1998 |
| FR | 2774562 | 8/1999 |
| GB | 2322286 | 8/1998 |
| WO | WO00/13537 | 3/2000 |
| WO | PCT/US2004015132 | 2/2006 |

OTHER PUBLICATIONS

Luisa Zargani, One Fine Year; Anton Magnani's Quirky Dry-Shod Designs Have Gained the Italian Designer Respect, Recognition and a Deal With Comme Des Garcons, *Footwear News*, Aug. 2, 1999, p. 102 (2 pages).

Finproject Brews an Extralight (Evasol Plastics and Finproject signed a joint venture agreement to introduce a range of a new block and net-fit soles for shoes), *FN World*, Aug. 4, 1997, v. 53, n.31, p. 8 (1 page).

Cindy Macdonald, The entrepreneurs: they're bilingual, multicultural and talented. Distance and language present no barriers to Quebec plastics processors and moldmakers as the province's plastics industry continues to increase its level of exports and welcome new companies, *Canadian Plastics*, O'99, v. 57(10), p. 35-50 (9 pages).

The Elastomers Times: Engage Adds Comfort to Sporting Components, *Chemical Business NewsBase: The Elastomers Times*, Friday, Dec. 1, 2000, (1 page).

Comfortable Walking, *Italian Technology*, Oct. 1999, No. 3, p. 168, (abstract, 1 page).

Injected Eva, *Macolas International*, Aug. 1999, No. 10, p. 90, (abstract, 1 page).

Walking on Modified Eva, *Italian Technology*, May 1999, No. 2, p. 121, (abstract, 1 page).

Trade Name Record, *Official Gazette of the US Patents and Trademarks Office*, Mar. 24th 1998, 1208, No. 4, p. 73, (abstract, 1 page).

*Engage® polyolefin elastomers, the critical ingredient for success*, DuPont Dow elastomers, Copyright @ 2000 DuPont Dow Elastomers, www.dupont-dow.com/engage (12 pages).

waldenstore.com, *Footwear, Waldies*, Aug. 4, 2003, http://www.waldenstore.com/waldies.html, (1 page).

Birkenstock®, Spring & Summer 2003 Catalog, *Birkenstock Orthopudie GMbh, Germany*.

Birkenstock® , Spring & Summer 2003 Catalog, Birkenstock Orthopudie GmbH, Germany (82 pages).

*Plaintiff's Statement of Claim, Foam Creations Inc. vs. Holey Soles Holdings Ltd.*, Ontario, Canada Federal Court, Jan. 28, 2005, Ridout & Maybee LLP (8 pages).

*Defendant's Statement of Defence, Foam Creation Inc. vs. Holey Soles Holdings Ltd.*, Ontario, Canada Federal Court, Court File No.-161-05, Mar. 10, 2005, Oyen Wiggs Green & Mutala LLP (9 pages).

*Defendant's Response to Request for Particulars, Foam Creations Inc. vs. Holey Soles Holdings Ltd.*, Ontario, Canada Federal court, Court File No. T-161-05, Apr. 22, 2005, Oyen Wiggs Green & Mutala LLP (including Appendices A-C, 236 pages).

*Plaintiff's Request for Particulars of Defence, Foam Creations Inc. vs. Holey Soles Holding Ltd.*, Ontario, Canada Federal Court, Court File No. T-161-05 May 1, 2005, Ridout Y Maybee (5 pages).

*Plaintiff's Further Request for Particulars, Foam Creations Inc. vs. Holey Soles Holdings Ltd.*, Ontario, Canada Federal court, Court File No. T-161-05, May 12, 2005, Ridout & Maybee (including Schedule A, 6 pages).

*Plaintiff's Reply, Foam Creations Inc. vs. Holey Soles Holdings Ltd.*, Ontario, Canada Federal Court, Court File No. T-161-05, Ridout & Maybee (7 pages).

http://web.archive.org/web/19980420230857/www.birkenstock.com/featprof.hum (3 pages).

Complaint, *Holey Soles Holdings Ltd v. Foam Creations, Inc. and CROCS, Inc.* (05CV6893 (MBM)(AJP) S.D.N.Y. filed Aug. 2, 2005).

\* cited by examiner

FOOTWEAR PIECES

CROSS-REFERENCES TO RELATED APPLICATIONS

The present application is a continuation in part of U.S. patent application Ser. No. 10/603,126, entitled "BREATHABLE WORKSHOES AND METHODS FOR MANUFACTURING SUCH", filed on Jun. 23, 2003 now U.S. Pat. No. 6,993,858, and assigned to an entity common herewith; and U.S. patent application Ser. No. 10/602,416, entitled "FOOTWEAR PIECES AND METHODS FOR MANUFACTURING SUCH", filed on Jun. 23, 2003 still pending, and assigned to an entity common herewith. The entirety of each of the aforementioned patent applications are incorporated herein by reference for all purposes.

BACKGROUND OF THE INVENTION

The present invention is related to footwear, and in particular to footwear including straps.

The commonly known flip-flop has long been popular with consumers, however, it is often difficult to maintain the flip-flop secure to the foot. Thus, for applications where a person's shoes must be maintained secured to the foot, the flip-flop has proven to be unsatisfactory.

As a sandal typically includes a strap capable of securing the sandal to the foot, in some cases a sandal may prove satisfactory where the flip-flop fails. However, such sandals often do not provide the ease of use offered by the flip-flop. Further, such sandals are typically made of relatively slick material that does not grip well on, for example, wet floors.

Thus, there exists a need in the art to address these and other limitations.

BRIEF SUMMARY OF THE INVENTION

Among other things, the present invention provides apparatus and methods for manufacturing footwear pieces. In various cases, the apparatus include a footwear form that includes a location mark corresponding to a location of a strap rivet. The footwear form is an inner portion of a footwear mold, and the footwear mold is comprised of an upper portion and a lower portion that at least substantially encompass the footwear form.

Some embodiments of the present invention provide footwear molds that include a footwear form with a location mark corresponding to the location of a strap rivet. Such a location mark can be, but is not limited to, a metal piece extending from the footwear form. In some instances, a location mark extending from the footwear form causes a reduced amount of molding material to form at the location of the location mark. In particular cases, this can result in a hole or an indentation in a formed footwear piece at the location where the rivet associated with a strap on the footwear piece is to be attached. In other instances, the location mark extends into the footwear form such that an increased amount of molding material forms at the location where the rivet associated with a strap on the footwear piece is to be attached. Thus, for example, a raised "X" shaped mark may result from use of the footwear form. In some cases, the location mark further includes a halo section that roughly corresponds to the size of a rivet head upon expansion of a material forming an expanded footwear piece.

In some cases, the footwear form is an inner portion of the footwear mold, and the footwear mold further includes an upper portion and a lower portion that at least substantially encompass the footwear form. The upper and/or lower portions can include molding material inlets capable of accepting molding material that will be formed into footwear pieces. In various cases, the footwear form is suspended from the interior of the upper portion.

Other embodiments of the present invention provide methods for manufacturing footwear molds. Such methods include forming a location mark in a footwear form. This footwear form can be, for example, an inner portion of a three piece mold. Further, the location mark can include a halo, and the method can include locating an outer edge of the halo approximately even with a pattern corresponding to an inner wall of a footwear piece, and/or locating an outer edge of the halo set-off from an outer edge of the footwear piece. In one particular embodiment, the outer edge is set-off approximately one sixteenth inch from an edge of the footwear piece after expansion of the footwear piece.

Some embodiments of the present invention provide molds for manufacturing sectional shoe pieces that include a base section and a strap section. The base section includes an upper and a sole formed as a part. The strap section is formed as a second part that is attached to the base section such that the strap pivots relative to the base section. In some instances, the base section is molded of a continuous piece of foam material. Such foam material can be a lofted material manufactured using a resin base. Where a resin material is used, it can be mixed to exhibit an expansion coefficient, and a contraction coefficient. In particular cases, multiplying the expansion coefficient and the contraction coefficient results in a product, or a final growth value, of between 1.46 and 1.58, inclusively.

In various instances, the base section and the strap section are formed of the same material. Such material can be the aforementioned foam material formed into different shapes. In other cases, the strap section and the base section are formed of different materials. For example, the base section may be formed of leather and/or rubber, while the strap section is formed of foam. As another example, the base section may be formed of one type of foam, while the strap section is formed of another type of foam.

In some cases, the strap section is attached to the base section by rivets. Such rivets can be any connector that attaches the base section to the strap, while allowing the strap to pivot relative to the base section. In particular, one end of the strap section is riveted to one side of the base section, while the other end of the strap is riveted to the other side of the base section. In some cases, both the base section and the strap are punched to form holes through which the rivet is placed. In other cases, holes are formed in the strap section and/or base section as part of the manufacturing process. Such holes can be subsequently used to receive the rivets attaching the strap section to the base section. The rivets can be plastic rivets, or rivets formed of other materials such as, for example, metal and rubber. In many cases, the rivets are formed of a material that is denser than that of either the base section or the strap section.

The rivets can be placed at attachment points located on either side of the base section. Such attachment points can be located near a rear sole perimeter and/or near an upper opening perimeter. In some cases, the distance from the one attachment point to the other attachment point along the rear sole perimeter is approximately the same as the distance between the attachment points measured along the strap section. Thus, the strap section can pivot relative to the base section such that an inner portion of the strap section contacts an outer portion of the rear sole perimeter. A frictional force between the strap section and the base section at the contact between the inner portion of the strap section and the outer portion of the rear sole perimeter maintains the strap section fixed relative to the base section. In such a position, the strap section forms what appears to be a decorative portion of the base section, and does not interfere with inserting and removing a foot from the base section.

Similarly, the distance from one attachment point to the other attachment point along the upper opening perimeter is approximately the same as the distance between the attachment points measured along the strap section. Thus, the strap section can pivot relative to the base section such that an inner portion of the strap section contacts an outer portion of the upper opening perimeter. A frictional force between the strap section and the base section at the contact between the inner portion of the strap section and the outer portion of the upper opening perimeter maintains the strap section fixed relative to the base section. Again, in such a position, the strap section forms what appears to be a decorative portion of the base section, and does not interfere with inserting and removing a foot from the base section. Further, in some cases, the strap can be fixed in contact with either the upper opening perimeter or the rear sole perimeter.

In various cases, a number of ventilators are formed in the upper. Such ventilators can be holes of varying sizes that allow liquid and/or air to pass through at prescribed locations in the upper. In some cases, such ventilators are formed in both a substantially horizontal portion of the upper and a substantially vertical portion of the upper. This provides for a significant amount of ventilation for applications where it is not necessary to protect the foot from exposure to liquids entering through the ventilators. Such applications can include, but are not limited to, boating, beach use, fishing, and the like.

Alternatively, some instances include a solid covering over the substantially horizontal portion of the upper, while including ventilators formed in the vertical portions of the uppers. This provides for sufficient ventilation, while at the same time protecting a foot from spilled liquids. Such an approach may be desirable for applications including use by medical personnel, chefs, and the like. Further, in some cases, a liquid conductor is formed around at least a portion of a perimeter of each of the plurality of ventilators. Such a liquid conductor transfers a liquid spilled on the upper around and away from the various ventilators formed in the substantially vertical portion. Such conductors can thus further protect the foot from exposure to spilled liquids.

In particular cases, the toe region of the upper is extended at a location corresponding to the larger toes of the human foot. Thus, the toe region of the upper generally follows the contour of a human foot from larger toes on the inside of the shoe to smaller toes on the outside of the shoe. Such an approach can provide increased comfort and/or functionality. Further, the rear perimeter of the sole can be raised above a support base further increasing the functionality of the shoe. This support base can include a raised pattern where the foot contacts the shoe.

One particular embodiment provides a piece of footwear that comprises a sole and an upper portion extending from the sole. The upper portion is adapted to cover the top of a user's foot and includes a rear opening for receiving the user's foot. At least one connector is coupled to the upper portion, and a strap is operably coupled to the upper portion. The strap is configured to be positioned across the rear opening to engage the back of the user's foot. The piece of footgear also includes at least one adjustment mechanism that is interactable with the connector and the strap to adjust the position of the strap relative to the back of the user's foot.

In one aspect, the connector comprises a loop that is pivotally coupled to the upper portion. The adjustment mechanism may comprise a strip of fabric having one end coupled to the strap and a free end that is configured to pass through the loop. Also, the adjustment mechanism may further comprise a coupling arrangement to couple the free end of the strip of material to the strap. The coupling arrangement may comprise a plurality of snaps, a hook and loop fastener material, or the like.

In some cases, the piece of footgear may utilize a pair of connectors that are coupled to opposite sides of the rear opening, and a pair of adjustment mechanisms that are interactable with the pair of connectors. In this way, both ends of the strap may be adjusted.

Other embodiments of the present invention provide molds for manufacturing sectional shoe pieces that include a base section and a strap section. The strap section is attached to the base section using a rivet such that the strap is pivotable relative to the base section. The rivet can be made of metal, plastic, or some other material. In some cases, the base section is formed of a continuous piece of foam, while in other cases, the base section includes an assemblage of multiple constituent parts. The parts can be formed of various materials including, but not limited to, foam, plastic, rubber, leather, and/or the like.

This summary provides only a general outline of some embodiments according to the present invention. Many other objects, features, advantages and other embodiments of the present invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Among other things, the present invention provides various molds and methods for using such to manufacture footwear pieces. In various cases, the footwear pieces are molded from a lofted material. Further, in various cases, the footwear pieces include a pivoting strap that can be moved into contact with and fixed in relation to the sole of the footwear piece, or moved into contact with and fixed in relation to the upper of the footwear piece.

Figure 1:
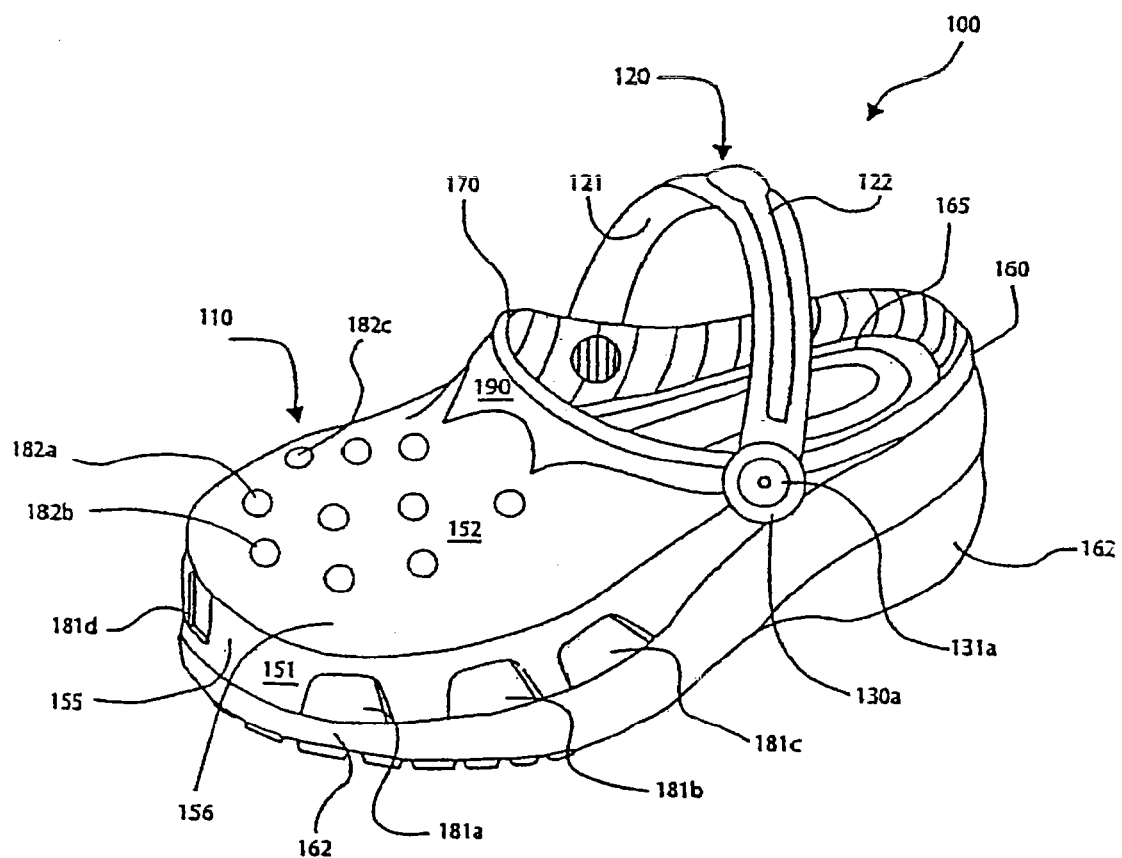
FIGS. 1–6 are views of a footwear piece in accordance with embodiments of the present invention.

Turning to FIG. 1, a footwear piece 100 in accordance with some embodiments of the present invention is illustrated. Footwear piece 100 includes a base section 110 and a strap section 120. Base section 110 includes an upper 150 and a sole 162. In some embodiments, base section 110 is molded as a single piece of foam material. In other embodiments, sole 162 is molded from a foam or other foam like material, while upper 150 is manufactured of a different material that is later assembled with sole 162 to form base section 110.

Upper 150 includes a substantially horizontal portion 152 that can include one or more ventilators 182. Ventilators 182 can be, but are not limited to, openings that are formed in upper 150 as base section 110 is being molded. Alternatively, ventilators 182 can be openings formed in upper 150 after formation and/or assembly of upper 150. As yet another alternative, ventilators 182 can be formed as part of an assembly process associated with upper 150. Thus, for example, ventilators 182 can be openings between assembled parts of upper 150. Based on the disclosure provided herein, one of ordinary skill in the art will appreciate a number of different ventilator types and methods for forming such.

Upper 150 further includes a substantially vertical region 151 that includes one or more ventilators 181. As with ventilators 182, ventilators 181 can be, but are not limited to, openings that are formed in upper 150 as base section 110 is being molded. Alternatively, ventilators 181 can be openings formed in upper 150 after formation and/or assembly of upper 150. As yet another alternative, ventilators 181 can be formed as part of an assembly process associated with upper 150. Thus, for example, ventilators 181 can be openings between assembled parts of upper 150. Based on the disclosure provided herein, one of ordinary skill in the art will appreciate a number of different ventilator types and methods for forming such.

Upper 150 further includes a toe region 155 that surrounds the toes of a human foot when inserted into base section 110. In some embodiments, toe region 155 tapers from the inner area of base section 110 to the outer area of base section 110 such that it generally follows the contour of a human foot where larger toes exist at the inside of the foot, and the foot tapers to smaller toes on the outside. This can be functionally advantageous as the footwear piece 100 conforms to the shape of the human foot. In other embodiments, toe region 155 is a square cross section that does not exhibit tapering, while yet other embodiments provide a rounded square where the toe section has its greatest extension near the a central point of base section 110, and tapers in both directions from the central point. Based on the disclosure provided herein, one of ordinary skill in the art will appreciate a number of shapes for toe region 155.

As depicted, upper 150 includes a substantially horizontal region 152 that rises toward an upper opening perimeter 170. When worn, the upper opening perimeter can contact an area of the human foot in front of, and below the ankle. Upper 150 can be designed such that upper opening perimeter 170 is disposed only a short distance from toe region 155, in which case it will be formed in substantially horizontal region 152. Alternatively, upper 150 can be designed to extend farther up the foot toward the ankle, in which cases it will be in a more vertical region of upper 150. A decorative pattern 190 may or may not be formed or created near upper opening perimeter 170. As depicted, upper opening perimeter 170 can extend from the location of rivet 131a to that of rivet 131b (shown in other figures).

Sole 162 includes a rear sole perimeter 160 that defines the rear portion of sole 160. In some cases, this region is raised above a support base 165 that is the area that is in contact with the bottom part of the human foot. Such a raised rear sole perimeter provides some support to the heel of the human foot and helps maintain footwear piece 100 in position. In other embodiments, rear sole perimeter 160 is not raised.

Strap section 120 includes an outer region 122, an inner region 121, and rounded ends 130. In some cases, strap section 120 is attached to base section 110 by rivets 131 that are placed through holes in both strap ends 130, and in upper 150 at an attachment point. Strap section 120 can be pivoted in relation to base section 110 such that strap section 120 can contact upper opening perimeter 170 when pivoted in one direction, and rear sole perimeter 160 when pivoted in the other direction. In some embodiments, strap section 120 includes dimensions such that when strap section 120 is pivoted forward, inner region 121 contacts an outer surface of upper opening perimeter 170. A frictional force at the contact of inner region 121 and upper opening perimeter 170 maintains strap section 120 in a fixed position relative to base section 110.

Alternatively, strap section 120 can include dimensions such that when strap section 120 is pivoted backward, inner region 121 contacts an outer surface of rear sole perimeter 160. A frictional force at the contact of inner region 121 and rear sole perimeter 160 maintains strap section 120 in a fixed position relative to base section 110. In such positions, strap 120 can be a decorative portion of footwear piece 100.

As yet another alternative, strap section 120 can be placed in an intermediate position between rear sole perimeter 160 upper opening perimeter 170. In this position, the strap serves the utilitarian purpose of lending support to the Achilles portion of the human foot, thus helping to maintain footwear piece 100 in position on the human foot. In some embodiments, a frictional force developed between strap 120 and upper 150 at the location of the rivets is sufficient to maintain strap 120 in place. This helps to assure that strap 120 remains in place even when the Achilles part of the foot is not pressing against strap 120. Without such friction, strap 120 would succumb to gravity and fall to a position where the footwear piece may not be maintained secure to the foot. At the same time, it can be desirable to design the frictional force at the contact point sufficient to allow strap 120 to be readily moved.

In particular embodiments, strap 120 is formed of a foam material capable of significant deformation making footwear piece 100 comfortable for a large number of foot types. In other embodiments, strap 120 is form of a less deformable material offering greater surety that the foot will be maintained in the footwear piece. Yet other embodiments include an adjustable strap that includes significant deformability, yet is capable of capable of being securely strapped to the foot. Such embodiments are discussed further in relation to FIGS. 10 below.

Figure 2:
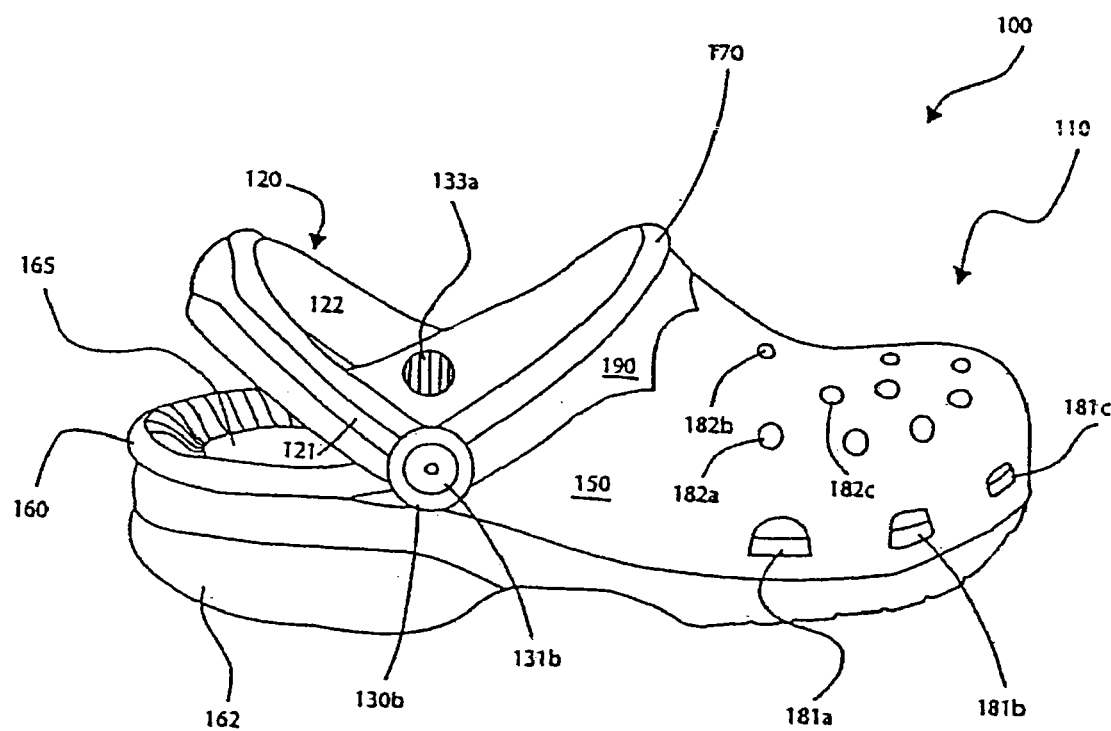
Figure 3:
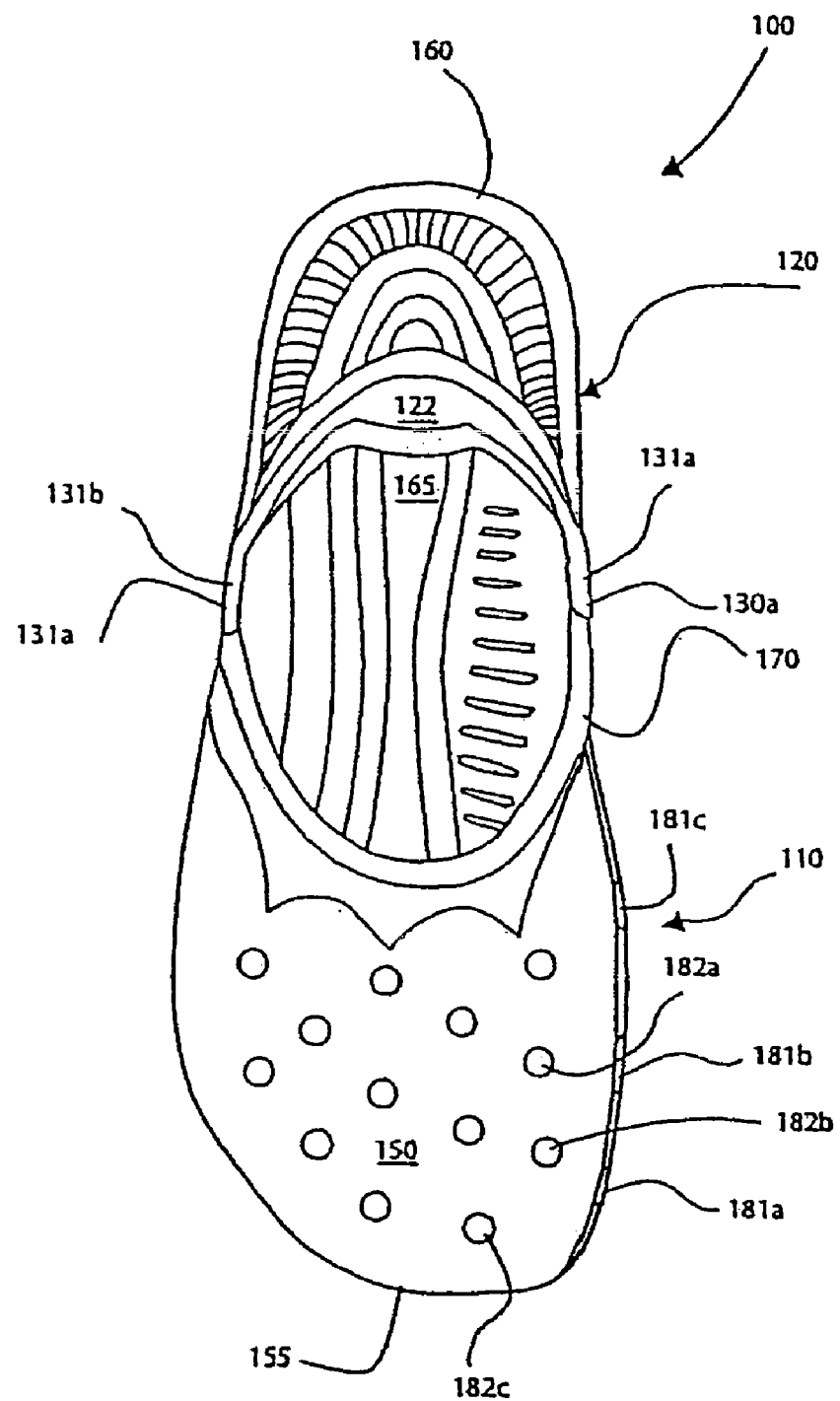
Figure 4:
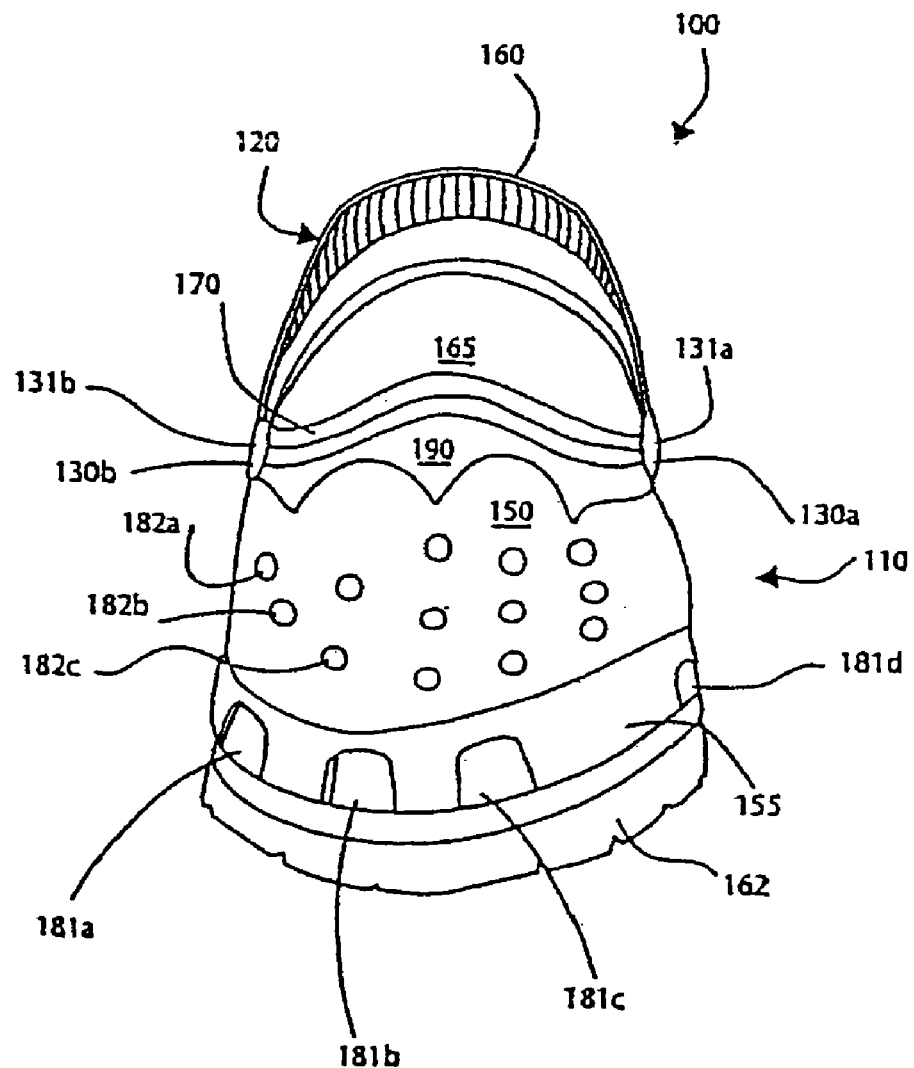
Figure 5:
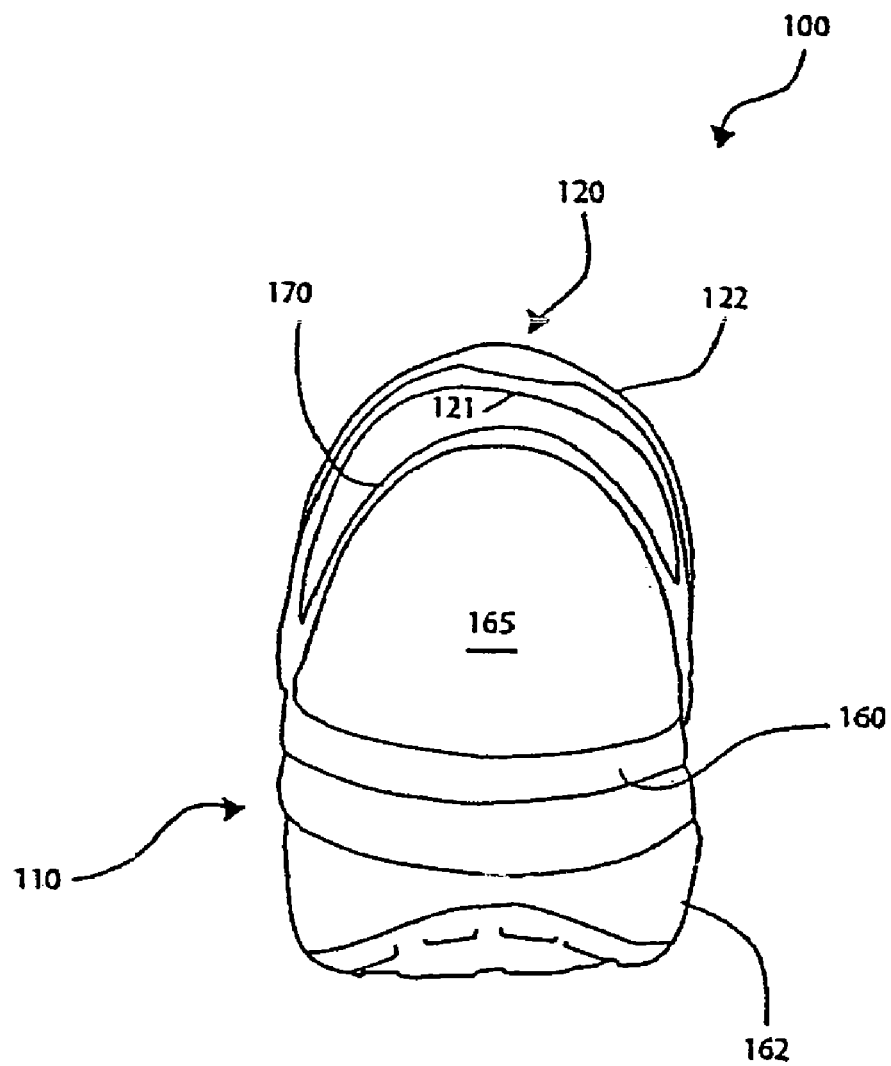
Figure 6:
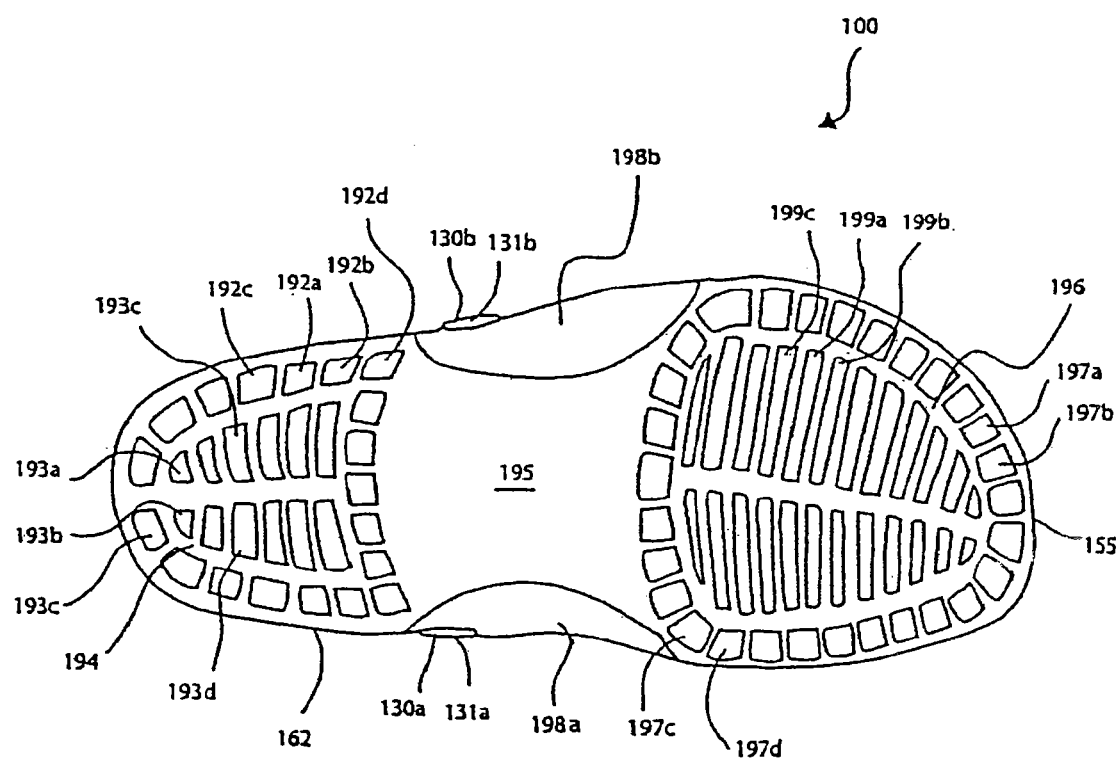

FIG. 2 depicts a side view of footwear piece 100, while FIG. 3 provides a top view of footwear piece 100. FIGS. 4 and 5 provide front and rear views, respectively, of footwear piece 100. Further, FIG. 6 illustrates the bottom of sole 162. As illustrated, sole 162 includes raised side portions 198, front tread pattern 196, and rear tread pattern 194. Front tread pattern 196 includes inner longitudinal tread portions 199, and outer rectangular tread portions 197. Similarly, rear tread pattern 194 includes inner longitudinal tread portions 193, and outer rectangular tread portions 192. Based on this, one of ordinary skill in the art will appreciate a number of other trade patterns and/or formations that can be used in relation to footwear piece 100.

Figure 7:
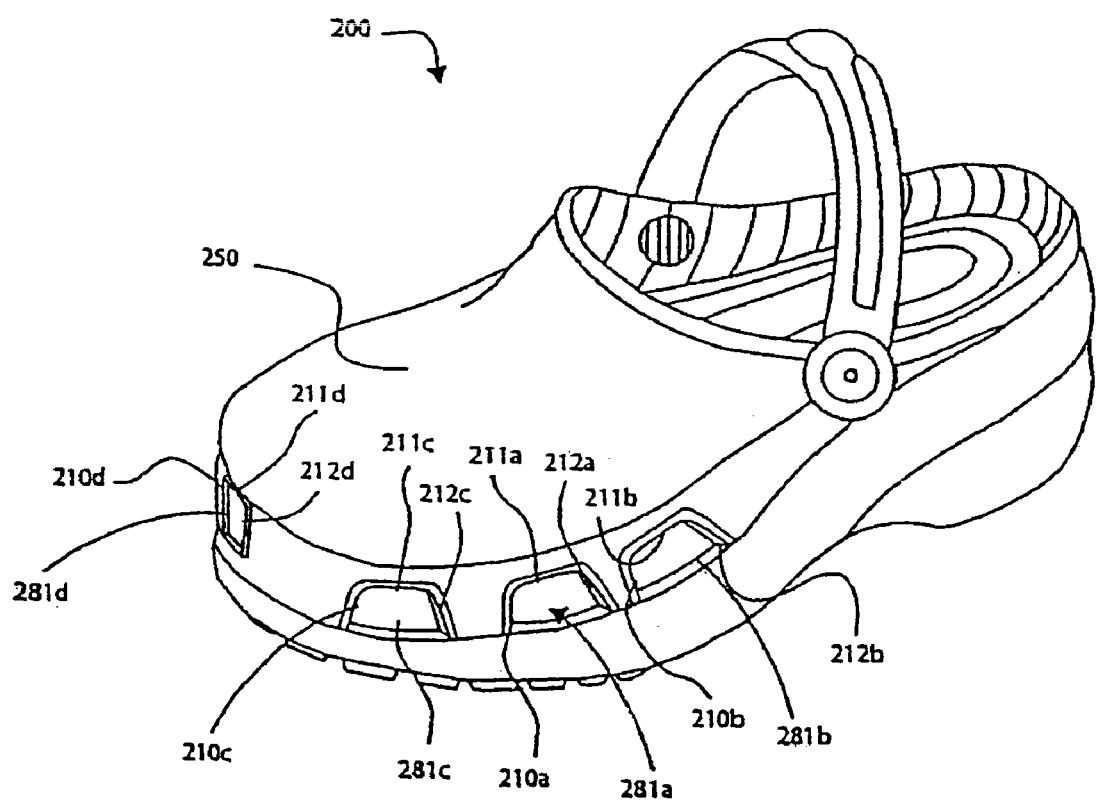
FIGS. 7–8 are views of another footwear piece in accordance with other embodiments of the present invention.
Figure 8:
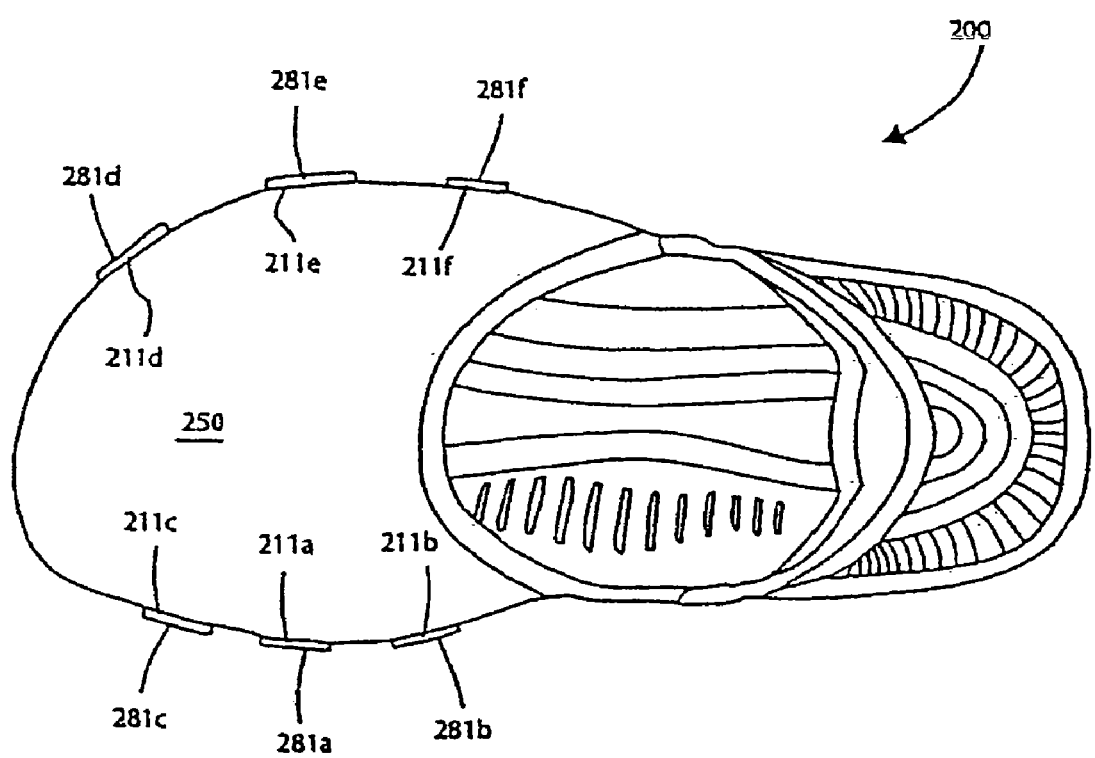

Turning to FIG. 7, another footwear piece 200 in accordance with other embodiments of the present invention is illustrated. Footwear piece 200 includes a number of features similar to that of the previously described footwear piece 100. In contrast, however, substantially horizontal portion 250 of the upper is of solid construction. As such, liquid materials that are spilled or otherwise contact substantially horizontal portion 250 do not permeate footwear piece 200. This can be advantageous in medical or other commercial applications where the foot needs at least some protection from spilled materials. Further, a number of ventilators 281 are formed in the substantially vertical portion of the upper. Liquid conductive portions 210, 211, 212 are formed around each of ventilators 281. Liquid conductive portions 210, 211, 212 can be any formation or structure that can divert a liquid falling from above footwear piece 200 from entering through ventilators 281. In one embodiment, liquid conductive portions 210, 211, 212 are molded as part of the upper. FIG. 8 is a top view of footwear piece depicting the various liquid conductive portions.

Figure 9:
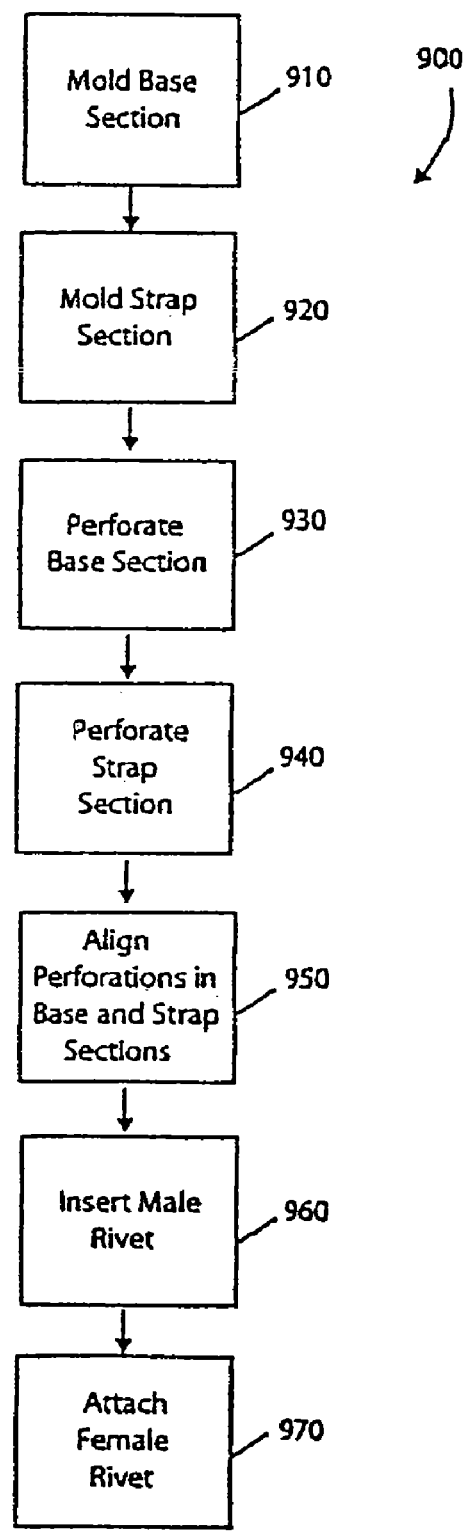
FIG. 9 is a flow diagram illustrating methods for manufacturing in accordance with embodiments of the present invention.

FIG. 9 is a flow diagram 900 illustrating a method in accordance with the present invention for manufacturing footwear pieces. Following flow diagram 900, a base section and strap section are molded (blocks 910, 920). The base section and strap section are perforated at the location where the two pieces are to be connected (blocks 930, 940). The perforations in the strap and base section are aligned (block 950), a male portion of a rivet is inserted through the aligned perforations (block 960), and a female portion of the rivet is mated to the male portion, thus securing the strap to the base section.

Figure 10A:
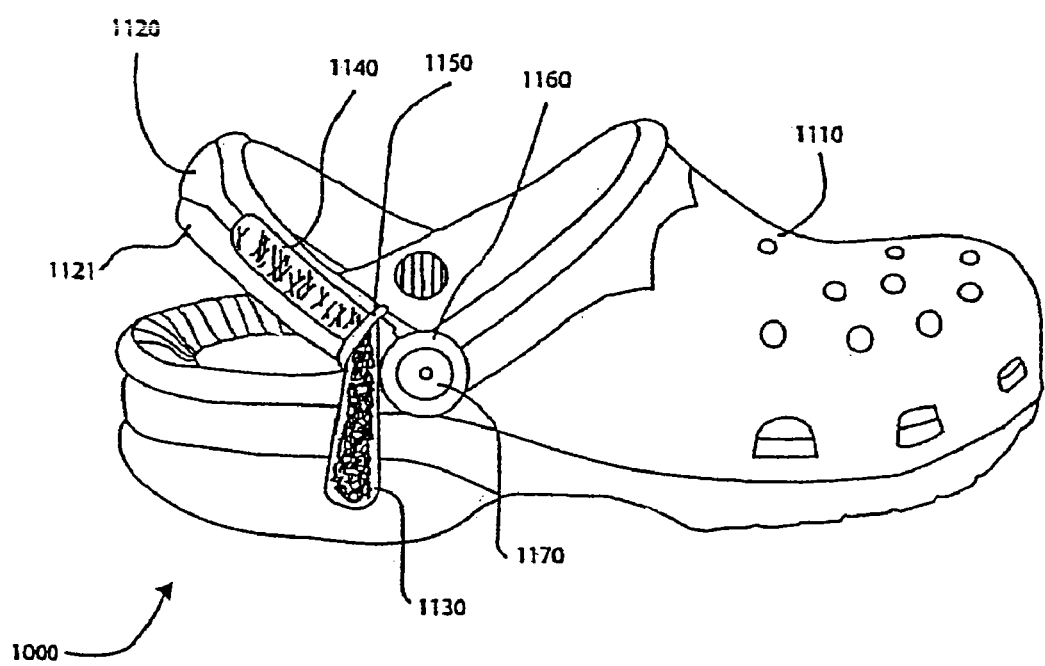
FIGS. 10a and b illustrate another footwear piece in accordance with other embodiments of the present invention.

Turning to FIG. 10a, another footwear piece 1000 in accordance with other embodiments of the present invention is illustrated. Footwear piece 1000 is similar to previously described footwear piece 100, except that strap 120 has been modified to allow for adjustment. As illustrated, a strap 1120 includes a main portion 1121 and a connection portion 1160. Connection portion 1160 is attached to a base section 1110 of footwear piece 1000 by a rivet 1170, or some other pivotable (or even non-pivotal) connection as is known in the art. One end of main portion 1121 is attached directly to the footwear piece at its opposite side. This may be done by a rivet (not shown) or some other type of connection. The other end of main portion 1121 includes a connector 1140, such as a length of a hook and loop fastener material, such as VELCRO. Connector 1140 includes a portion 1130 extending like a tongue from main portion 1121.

Figure 10B:
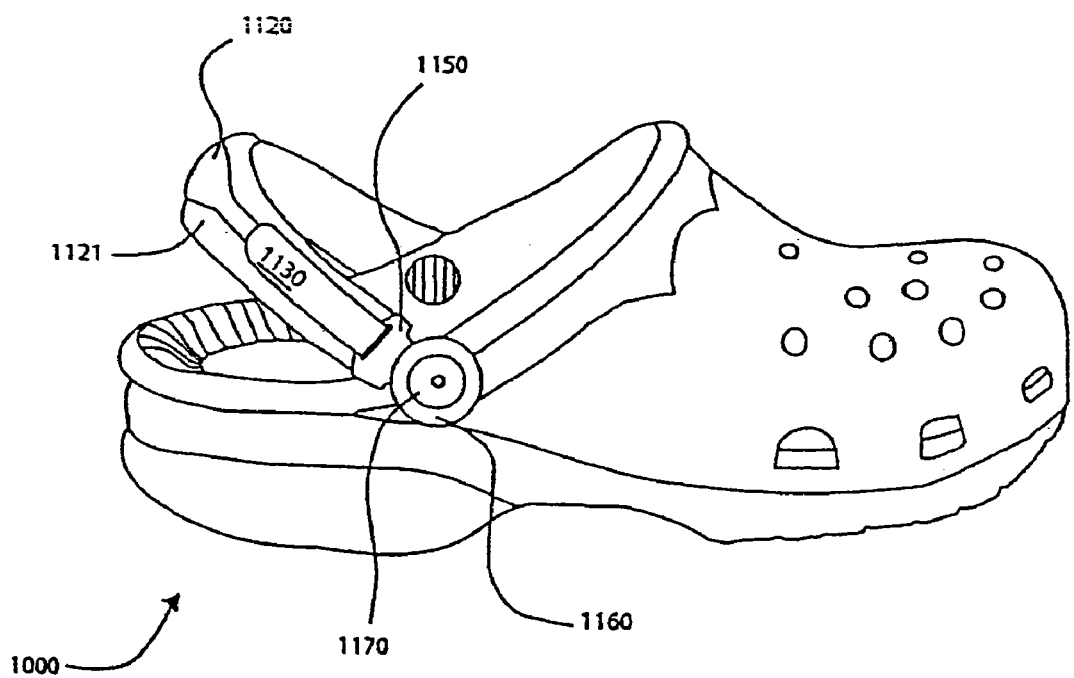
FIGS. 10c and d illustrate the footwear piece of FIGS. 10a and b, with an alternative coupling arrangement according to the present invention.

Portion 1130 is fed through a loop 1150 that is attached to or integrally formed with connection portion 1160 and pulled until the desired tightness is achieved. As connection portion 1160 is pulled tighter, main portion 1121 is pulled tighter against the user's foot. Advantageously, this adjustment may happen while the user is wearing the piece of footgear. Portion 1130 is then laid over the part of connector 1140 that is attached to main portion 1121 as depicted in FIG. 10b. One of ordinary skill in the art will appreciate that other connection materials can be used in place of VELCRO, such as snaps, hooks, clips, strings that are tied together, and the like. Further, based on the disclosure provided herein, one of ordinary skill in the art will appreciate that an adjustment mechanism (such as connection portion 1160 and connector 1140) can be used on either or both sides of strap 1120, or can be placed in the center of strap 1120 (with strap 1120 being formed into two sections).

Figure 10C:
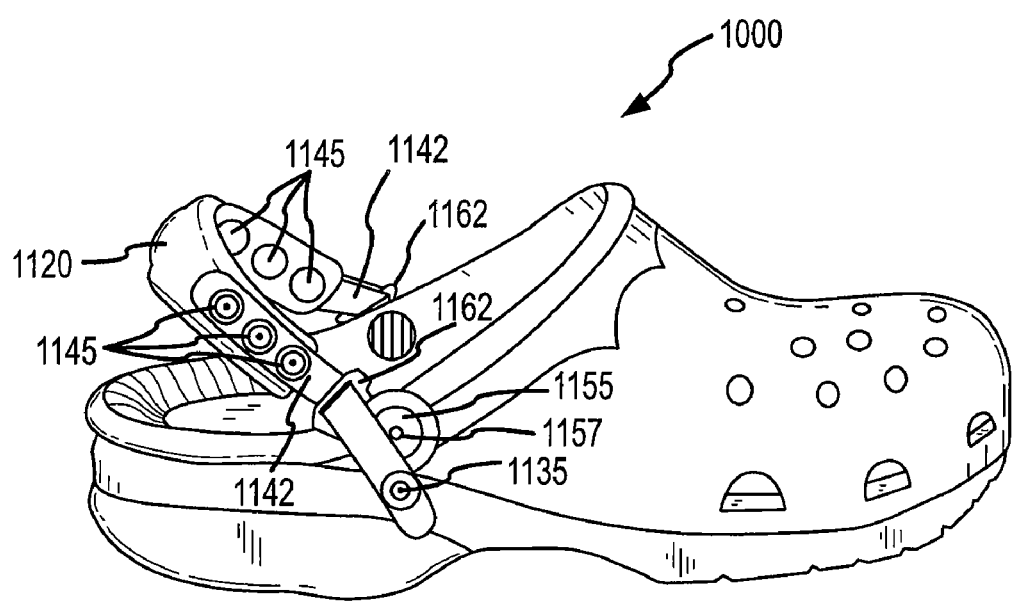
Figure 10D:
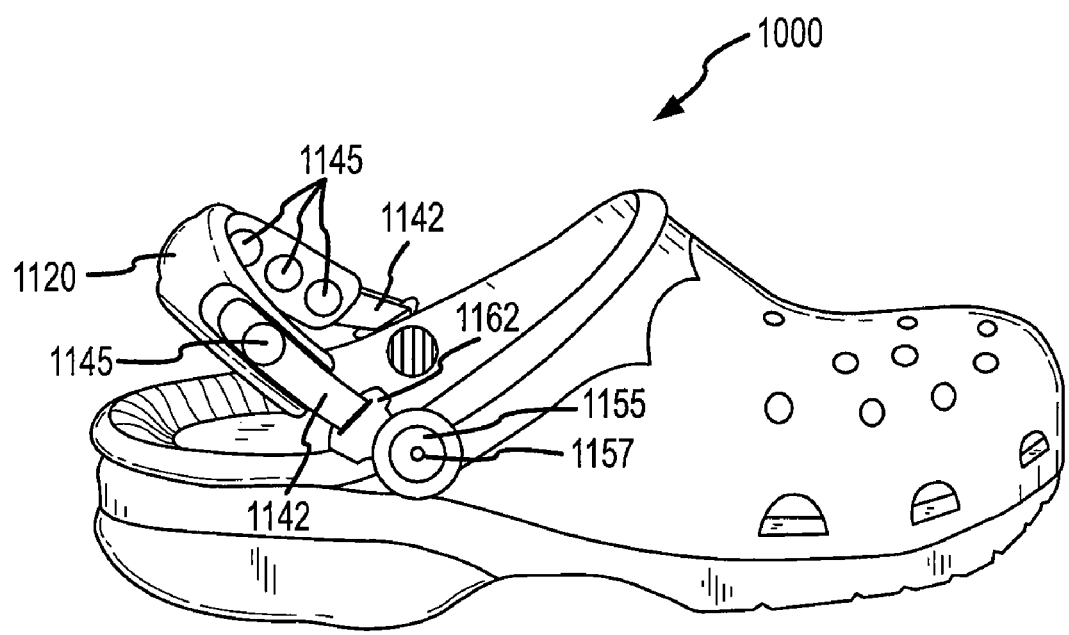

As shown in FIG. 10c, footwear piece 1000 may be modified to include other ways to adjust strap 1120. More specifically, a strip 1142 of material, such as a strip of durable fabric, may be coupled to strap 1120, such as by using one or more male snap members 1145. The other end of strip 1142 includes a female snap member 1135. Also coupled to footwear piece 1000 is a pivotable connection portion 1155 that is coupled using a rivet 1157 or other type of connector. Connection portion 1155 also includes a loop 1162 that may be constructed of a plastic, durable fabric or the like. In use, strip 1142 is passed through loop 1162 and then folded back on itself in a manner similar to connector 1140 in FIG. 10a. Snap member 1135 is then snapped into one of the male snap members 1145 once the appropriate tension has been achieved against the back of the user's heel. Each side of footwear piece 1000 may include a connection portion 1155 as shown, or alternatively, only one side could include one. Also, this type of configuration could be used on the center of strap 1120. Further, it will be appreciated that loop 1162 may be located on strap 1120 while strip 1142 is located on footwear piece 1000.

In one aspect, the inside of strap 1120 may include detents for receiving the button portion of male snap member 1145 so that the button does not rub against the user's leg. A barrel extends from the button, through strap 1120 and through strip 1142 where it is connected to the stud of male snap member 1145 as is known in the art. Female snap member 1135 also has a button with a barrel that passes though strip 1142. A socket is coupled to the barrel to form female snap member 1135. In this way, the stud may be placed into the socket to connect male snap member 1145 with female snap member 1135. Also, it will be appreciated that the location of male snap member 1145 and female snap member 1135 may be swapped.

By providing an adjustable strap, the piece of footwear may easily be adjusted to conform to a wide variety of foot sizes. Further, such an adjustment mechanism permits the piece of footwear to be used under a wide range of conditions. For example, during hiking, a user may desire to replace hiking boots with the lighter piece of footgear when crossing a stream. Because the footgear is so light, it may hang from the person's pack and be quickly removed when ready to cross the stream. Because the hiker will likely have bare feet, the strap may be adjusted to be tighter on the user's foot.

As another example, the same hiker may want to use the footgear over a pair of fishing waders. In such cases, the strap may be adjusted to accommodate for the thickness of the waders. In other cases, the footgear may be used for running races, including marathons. The strap may be used to adjust the footgear to the size of the runner's foot.

Figure 11:
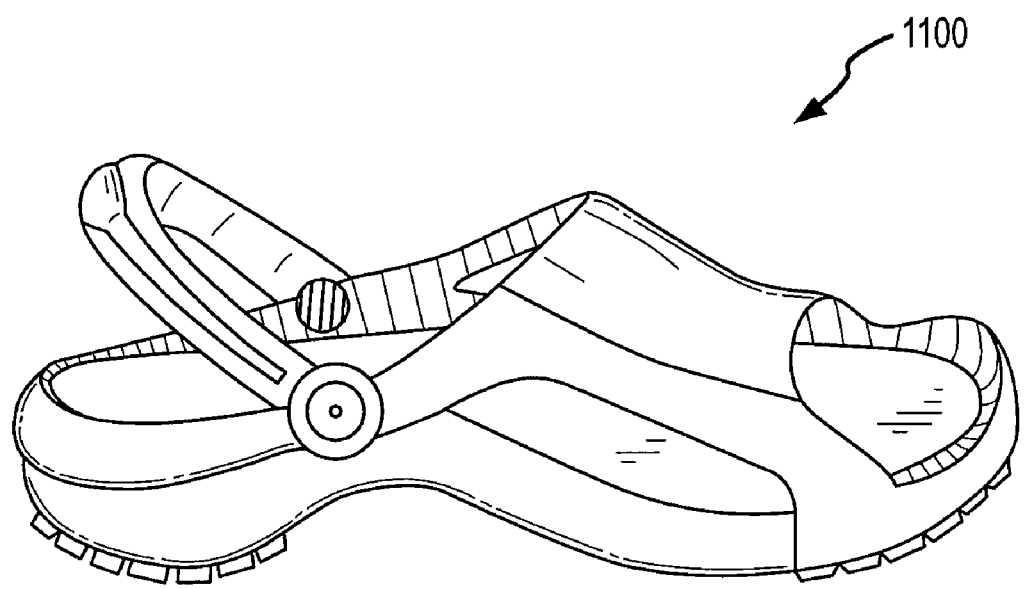
FIG. 11 illustrates yet another footwear piece in accordance with various embodiments of the present invention.

FIG. 11 illustrates yet another footwear piece 1100 in accordance with some embodiments of the present invention. Footwear piece 1100 is an open toe model with a pivotable strap. Based on the disclosure provided herein, one of ordinary skill in the art will appreciate that adjustable strap 1120 depicted in FIG. 10 can also be used in relation to footwear piece 1100.

As previously suggested, the footwear pieces disclosed herein can be made of a lofted foam material. Manufacturing footwear pieces using such a lofted foam material can include providing a resin that includes a pre-mixture of resin, pigment, and a growth additive. The resin, originally in pellet form, is heated to a liquid state. This liquid resin is screwed into a mold that has been heated prior to receiving the resin. The volume of resin screwed into the mold is controlled by the pitch of the screw that drives the liquid resin into the mold. The liquid resin is allowed to set, at which time the mold is opened and the formed footwear piece is removed from the mold. The formed footwear piece is then placed on a cooling last, where it is allowed to air dry.

During this process, a relatively small footwear piece conforming to the size of the mold is created, but when the mold opens, the footwear piece springs out as it expands in size. Then, as the footwear piece is air cooled, it contracts to a final size. Thus, the process involves both an expansion characteristic and a contraction characteristic. Multiplying the size of the footwear piece in the mold by the expansion characteristic yields the size of the footwear piece after the mold is opened. Multiplying the expansion characteristic by the contraction characteristic provides a final growth value representative of the final size of the shoe relative to the mold.

In such a manufacturing process, a number of elements can be controlled to achieve the desired end result. These elements include, the volume of material introduced into the mold, the size of the mold, the composition of the material being used, and the size of the cooling last. Previous manufacturers of molded footwear products have used, for example, four sizes of molds to create six different sizes of footwear pieces. Thus, for example, to create two different sized shoes from the same mold, one volume of a material is screwed into a mold to create one shoe size, and another volume of the same material is screwed into the same mold to create a different shoe size. Once removed from the mold, the shoes are cooled on cooling lasts of different sizes. Thus, the process uses a modified volume and cooling last size to control the end product, while keeping the mold size and the composition fixed. While this creates shoes of different sizes, it has been found that control of the final sizes is somewhat limited and/or unpredictable.

In part to address this, embodiments of the present invention use a fixed volume and composition of material, and cooling last size, while varying mold sizes to control the size of the end product. It has been found that such an approach results in a heightened degree of control, when compared to the previously described approach. This approach is particularly valuable for shoes manufactured of the same color resin. Where different colors are involved, the composition of the resin may be varied across the colors to achieve size control between colors. This composition adjustment is more fully described below.

In one particular embodiment, the resin is Ethylene Vinyl Acetate copolymer (EVA) based material. In this particular case, additives are included with the EVA base to create an expansible and cross-linking material. More particularly, an expanding powder is added which decomposes at a specific temperature to produce gases which cause the material to rise as it sets within a mold. Accordingly, when the mold is opened, an instantaneous expansion of the molded part results. During this expansion, the dimensions of the part increase rapidly, while the proportions and shape remain reasonably constant providing a consistent shape of the end part relative to the original mold. Additional disclosure of such cross-linking and expansion is provided in European Patent 0 802 039 A2, filed on Mar. 25, 1997, and assigned to FINPROJECT™ of Italy.

Some embodiments of the present invention utilize an EVA as previously described that is known commercially as LEVIREX™, and is marketed by FINPROJECT™ of Italy. It has been found desirable to create a mixture of LEVIREX™ that exhibits a final growth value of between 1.47 and 1.58. In one particularly desirable embodiment, a final growth value of approximately 1.51 is used. This includes an expansion characteristic of approximately 2.5, and a contraction characteristic of approximately 0.6. This provides a relatively soft footwear piece that has very good anti-slip capabilities, and at the same time, size reproducibility and durability.

In some cases, the resin mixture (LEVIREX™, growth additive, and pigment) is modified depending upon the desired color of the footwear piece. This is at least in part due to the density of the pigment associated with certain colors. Were the resin mixture not adjusted, a green footwear piece would be produced appreciably smaller than a khaki footwear piece where all other factors remain constant. This can be unacceptable where, for example, the footwear pieces are to be sold over the Internet and the consumer is not capable of trying the footwear piece on before purchasing. To alleviate this, the final growth value for a green resin is adjusted to approximately 1.515, where the final growth value for the khaki resin is adjusted to approximately 1.505. Thus, by modifying the mixture, shoes of accurate sizes across multiple colors can be produced.

Figure 12A:
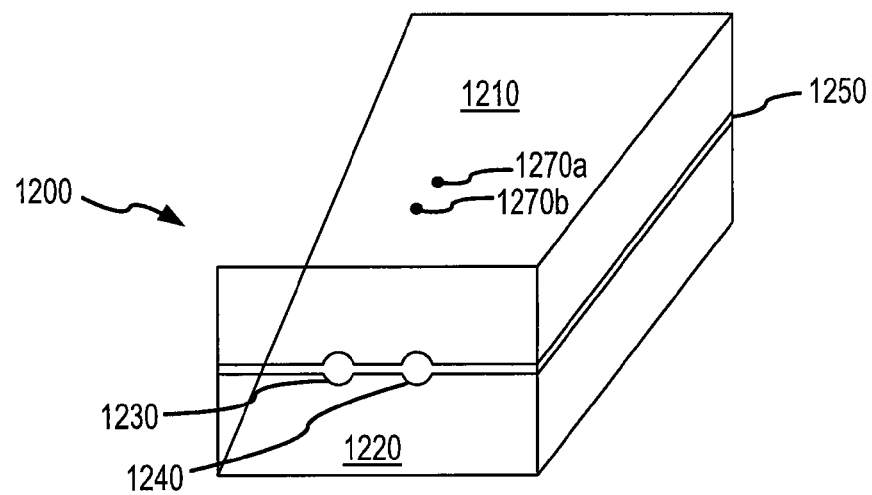
FIGS. 12 illustrate a footwear mold in accordance with various embodiments of the present invention.

Turning to FIG. 12*a*, a footwear mold 1200 in accordance with some embodiments of the present invention is illustrated. Footwear mold 1200 includes an upper portion 1210 and a lower portion 1220. Semicircular inlets 1230, 1240 are formed in both the upper portion 1210 and lower portion 1220 to allow for inserting molding material into mold 1200. One of ordinary skill in the art will recognize that full circle inlets in either the top or the bottom can also be used. Attachment screws 1270*a*, 1270*b* are also included to suspend a footwear form from the interior of footwear mold 1200 as more fully described below. As illustrated, upper portion 1210 and lower portion 1220 come into contact at location 1250. In one case, attachment screws 1270*a*, 1270*b* are not threaded, but rather are cylindrical with a clamp attachment groove cut into the end of attachment screws 1270 secured to the outer side of upper portion 1210. Further, attachment screws 1270 include a head region that mates with an internal footwear form (see FIG. 12*b* below).

Figure 12B:
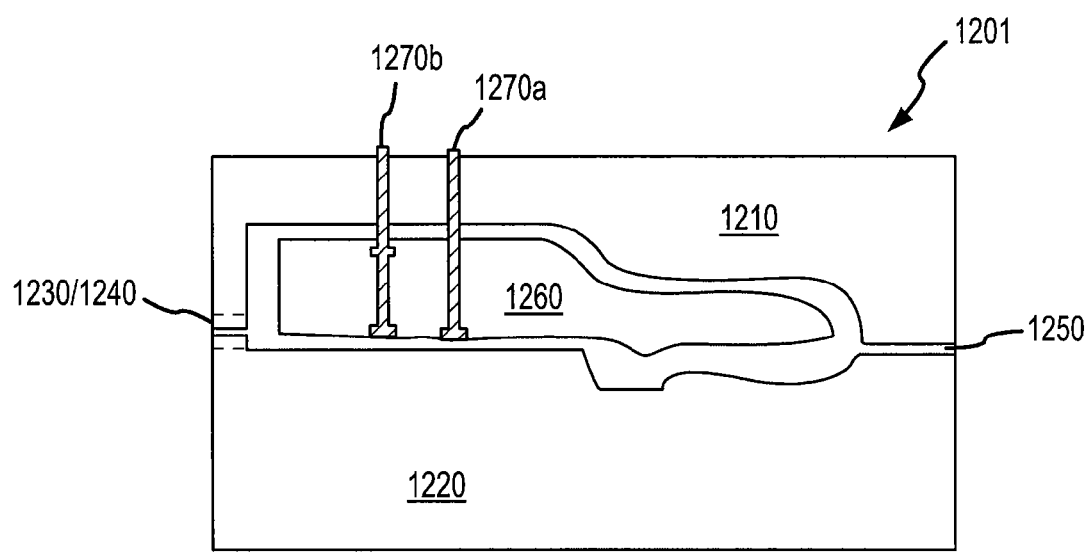
Figure 12C:
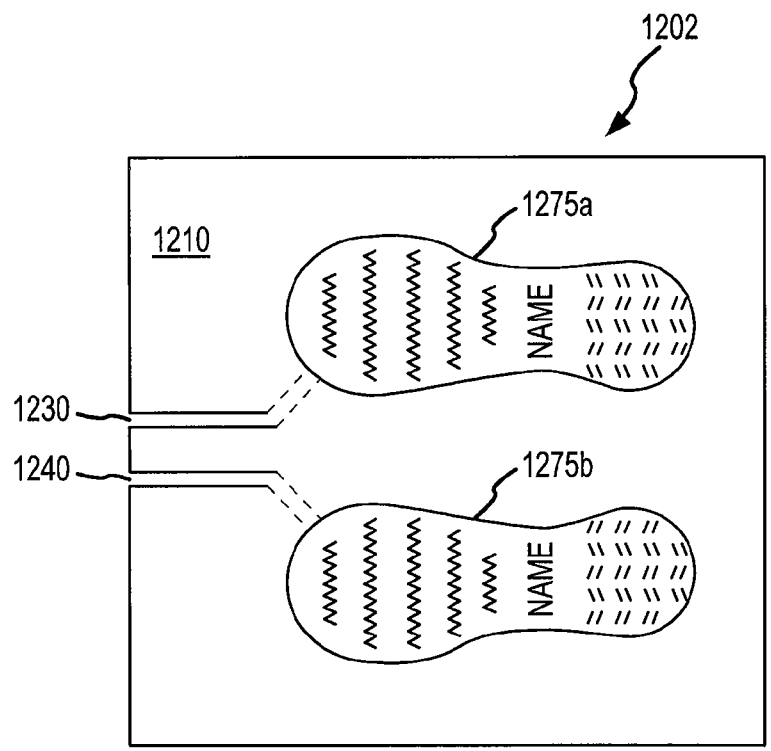
Figure 12D:
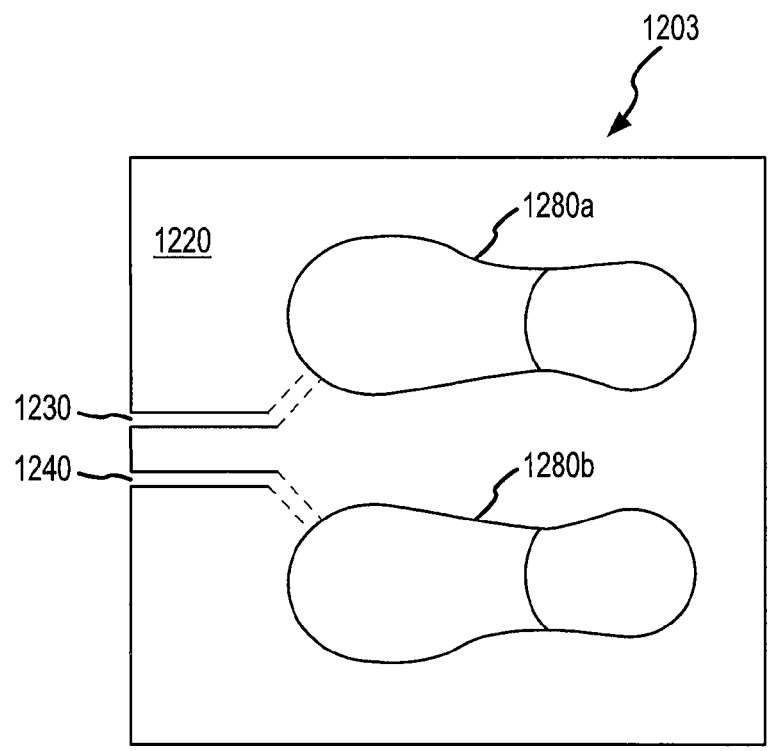

FIG. 12*b* shows a cut away cross section 1201 of footwear mold 1200. Cross section 1201 depicts a footwear form 1260 suspended within the interior formed by the combination of upper portion 1210 and lower portion 1220. FIG. 12*c* shows a top view 1202 of the interior of lower portion 1210. As illustrated, left and right shoe soles 1275*a*, 1275*b* are formed by inserting molding material through inlets 1230, 1240. FIG. 12*d* illustrates an interior view 1203 of upper portion 1220 showing the molding pattern for left and right uppers 1280*a*, 1280*b* of a footwear piece.

FIG. 12*e* illustrates a footwear form 1260 including outer and inner location marks 1290*a*, 1290*b* in accordance with some embodiments of the present invention. As illustrated, location marks 1290 include two posts that extend out from footwear form 1260. When a footwear piece is molded, less molding material is formed at the location of location marks 1290 creating a hole or indentation in the upper of the footwear piece. A rivet connecting a strap to the upper is forced through the upper at the indented or open area formed by location marks 1290. In other example, location marks 1290 could be indents in footwear form 1260 causing excess material to be formed at the location where the strap is to be attached. While not illustrated, individual footwear forms 1260 are formed to match each of left and right uppers 1280a, 1280b, and soles 1275a, 1275b.

Figure 13:
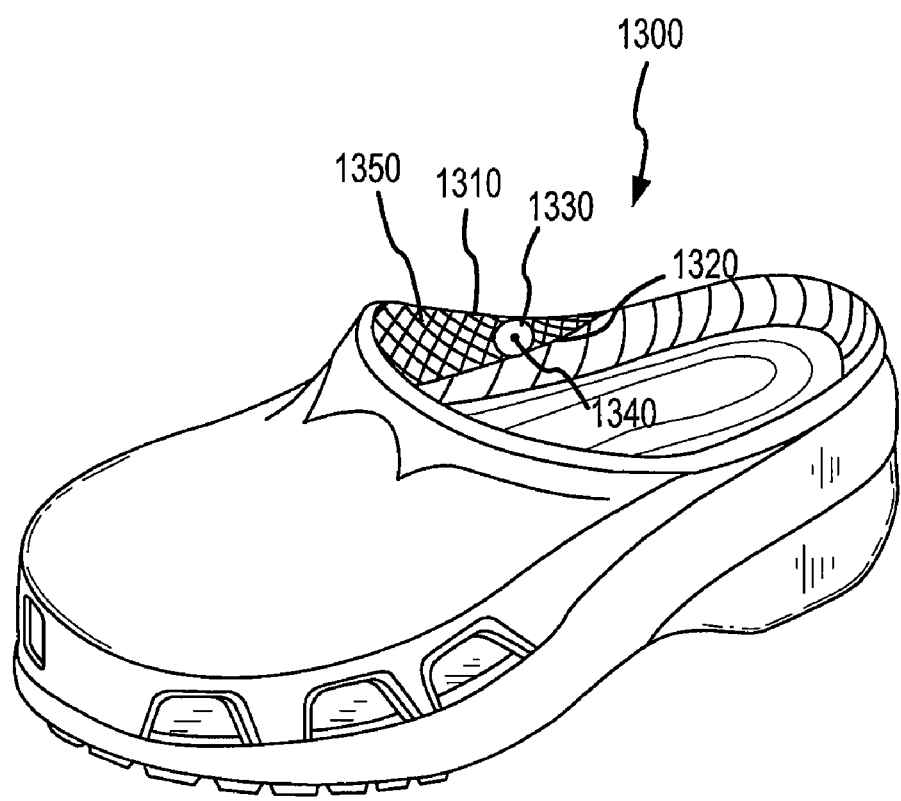
FIG. 13 illustrates an imprint of a location mark in accordance with some embodiments of the present invention.

FIG. 13 illustrates the placement of a location mark relative to a footwear piece 1300. In the illustrated embodiment, the location mark forms an indentation 1340 surrounded by a halo 1330, or imprint. Halo 1330 extends from approximately one sixteenth of an inch below an edge 1310 of footwear piece 1300 to an edge 1320 of a pattern 1350 formed on footwear piece 1300. Halo 1330 can be approximately the same size and shape as the head of the rivet connecting footwear piece 1300 to a strap (not shown). By offsetting halo 1330 from edge 1310, the installed rivet does not dig into a foot inserted into footwear piece 1300. Further, by placing halo 1330 in such a manner, the location of location marks can be ascertained as the center of halo 1330, where halo 1330 is located using edge 1310 and pattern 1350 as a guide. This insures consistency in location across molds.

The invention has now been described in detail for purposes of clarity and understanding. However, it will be appreciated that certain changes and modifications may be practiced within the scope of the appended claims. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A piece of footwear comprising;
   a sole;
   an upper portion extending from the sole, wherein to upper portion is adapted to cover to top of a user's foot, and wherein the upper portion includes a rear opening for receiving the user's foot;
   a pair of connectors rotatably coupled to the upper portion on opposite sides of the opening, wherein each of the connectors includes an aperture;
   a strap operably coupled to the upper portion, wherein the strap is configured to be positioned across the rear opening to engage the back of the user's foot, and wherein the strap is constructed of a lofted foam material and has a pair of ends;
   at least one adjustment mechanism that is interactable with the connector and the strap to adjust the position of the strap relative to the back of the user's foot, wherein the adjustment mechanism comprises at least one strip of material that is different from the lofted foam material and connected to the strap so as to have a pair of free ends that extend beyond each end of the strap;
   wherein the upper portion and the sole are formed as a first part molded from a first continuous piece of lofted foam material; and
   wherein the strap is attached to the connectors, with the ends of the strip of material passing through the aperture in each connector and then folding back on itself.

2. A piece of footwear as in claim 1, wherein the adjustment mechanism further comprises a coupling arrangement to couple the free end of the strip of material to the strap.

3. A piece of footwear as in claim 2, wherein the coupling arrangement comprises a plurality of snaps.

4. A piece of footwear as in claim 2, wherein the coupling arrangement comprises a hook and loop fastener material.

5. A piece of footwear comprising:
   a sole constructed of a moldable foam material;
   an upper portion integrally form with the sole which is constructed of the same moldable foam material, wherein the upper portion is adapted to cover the top of a user's foot, and wherein the upper portion includes a rear opening for receiving the user's foot;
   a pair of connectors rotatably coupled to the upper portion on opposite sides of the opening, wherein each of the connectors includes an aperture;
   a strap forming a heel piece that is configured to be positioned across the rear opening to engage the back of the user's foot, wherein the heel piece is constructed of a lofted foam material and has pair of ends;
   a pair of strips that comprise a hook and loop fastener material coupled to and extending from each end of the strap; and
   wherein the strips extend through the apertures in the connectors and then fold back on themselves, whereby the heel piece is angularly movable relative to the upper portion, and whereby the position of the heel piece relative to the user's foot may be adjusted by altering how the strips are folded back on themselves.

* * * * *